(12) United States Patent
Ragazzon

(10) Patent No.: US 11,007,504 B2
(45) Date of Patent: May 18, 2021

(54) METHOD FOR PRODUCING A FILTER MATERIAL CONTAINING IRON FOR THE TREATMENT OF WATER

(71) Applicant: Gruppo Zilio S.p.A., Cassola (IT)

(72) Inventor: Daniele Ragazzon, Borso del Grappa (IT)

( * ) Notice: Subject to any disclaimer, the term of this patent is extended or adjusted under 35 U.S.C. 154(b) by 741 days.

(21) Appl. No.: 15/572,080

(22) PCT Filed: May 5, 2016

(86) PCT No.: PCT/IB2016/052560
§ 371 (c)(1),
(2) Date: Nov. 6, 2017

(87) PCT Pub. No.: WO2016/181262
PCT Pub. Date: Nov. 17, 2016

(65) Prior Publication Data
US 2018/0133683 A1    May 17, 2018

(30) Foreign Application Priority Data

May 12, 2015    (IT) .......................... VE2015A000023

(51) Int. Cl.
*B01J 20/06*    (2006.01)
*C02F 1/28*    (2006.01)
(Continued)

(52) U.S. Cl.
CPC ......... *B01J 20/06* (2013.01); *B01J 20/28016* (2013.01); *B01J 20/3035* (2013.01);
(Continued)

(58) Field of Classification Search
CPC .. B01J 20/06; B01J 20/28016; B01J 20/3035; B01J 20/3071; B01J 20/3085; C01G 49/02; C02F 1/281
See application file for complete search history.

(56) References Cited

U.S. PATENT DOCUMENTS

2008/0271600 A1    11/2008    Schlegel

FOREIGN PATENT DOCUMENTS

DE    4320003    12/1994

OTHER PUBLICATIONS

Streat et al., "Hydrous ferric oxide as an adsorbent in water treatment Part 1. Preparation and physical characterization", Process Safety and Environmental Protection, 86, 1-9 (Year: 2008).*

* cited by examiner

*Primary Examiner* — James A Fiorito
(74) *Attorney, Agent, or Firm* — Themis Law

(57) ABSTRACT

A method for producing an iron-containing filter material for water treatment includes the steps of reacting a trivalent iron compound and a base inside a vessel until the trivalent iron is completely neutralized, to obtain an iron hydroxide and a salt consisting of the anion of the trivalent iron compound and the cation of the base; feeding the iron hydroxide and the salt into ceramic membranes to wash the iron hydroxide from the salt in cross-flow; feeding the iron hydroxide suspension to a membrane filter press where part of the water is removed, to obtain a panel having a moisture content of less than 77% by weight; inserting the panel into containers; and positioning the containers inside a refrigeration chamber operating at atmospheric pressure and at temperatures less than 0° C. for a time between 24 and 240 hours.

7 Claims, 1 Drawing Sheet

(51) Int. Cl.
B01J 20/28 (2006.01)
C01G 49/02 (2006.01)
B01J 20/30 (2006.01)
C02F 101/20 (2006.01)
C02F 101/10 (2006.01)

(52) U.S. Cl.
CPC ....... B01J 20/3071 (2013.01); B01J 20/3085 (2013.01); C01G 49/02 (2013.01); C02F 1/281 (2013.01); C02F 2101/103 (2013.01); C02F 2101/20 (2013.01)

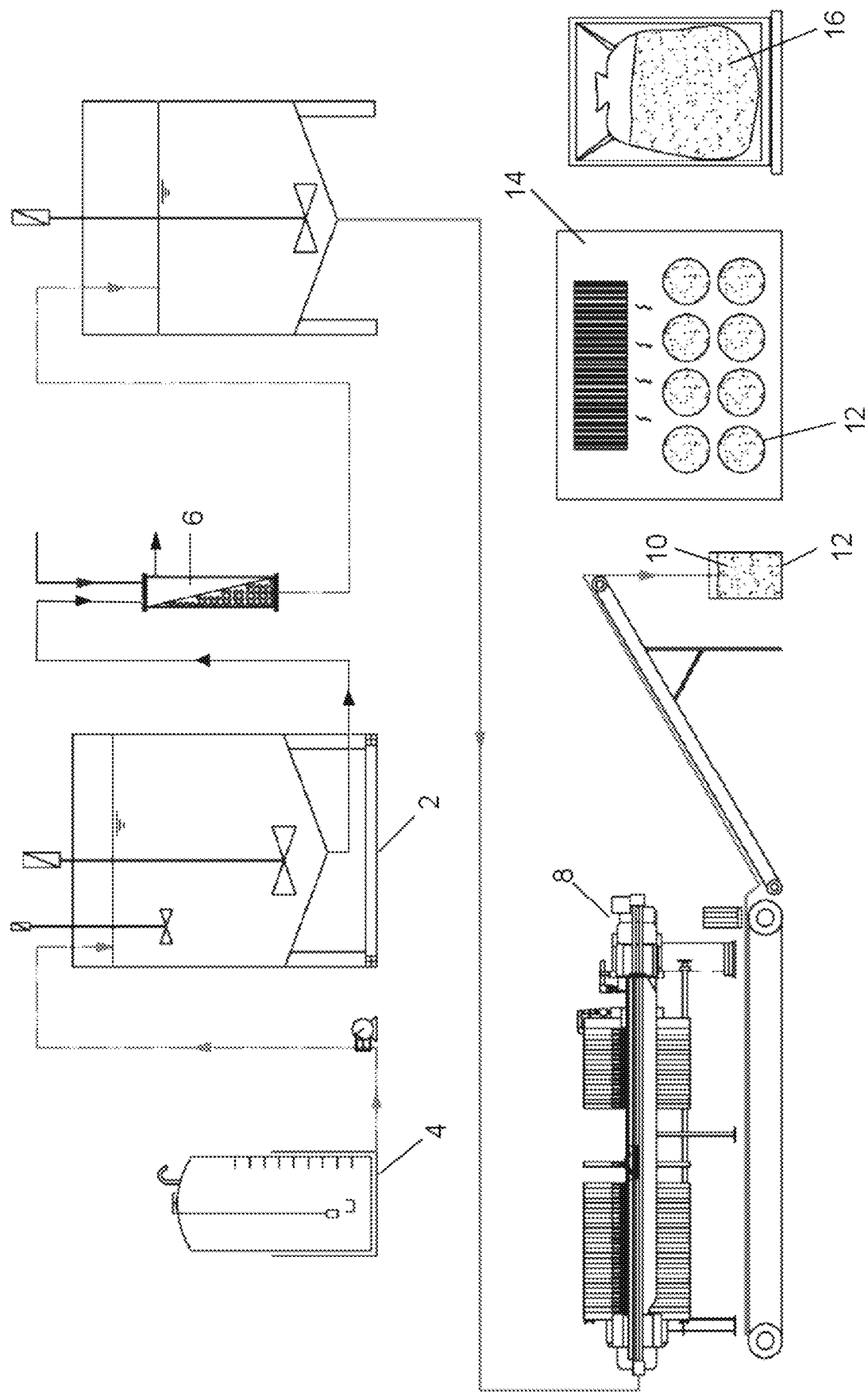

METHOD FOR PRODUCING A FILTER MATERIAL CONTAINING IRON FOR THE TREATMENT OF WATER

The present invention relates to a method for producing an iron-containing filter material for water treatment, a plant for implementing the method, and a filter material obtained by the method.

Filter materials based on iron oxides or hydroxides or oxyhydroxides are known to be able to remove undesirable contaminants such as phosphates, arsenic, vanadium, selenium, antimony and other metals from water.

Patent EP 1345688 describes a method for obtaining one of these materials, consisting of reacting ferric chloride with sodium hydroxide. The reaction product is an iron hydroxide in colloidal form, together with sodium chloride. The iron hydroxide is washed of the reaction salt, using one of the known methods, such as a repeated series of solid sedimentations, removing the supernatant, and re-dispersing the solid in pure water. On termination of the wash, a suspension of iron hydroxide is obtained practically free of the reaction salt. In EP 1345688, the colloid is separated from most of the water in which it is contained by centrifugation. Other methods are possible for reducing the water content of the colloid, in particular filtration in a filter press. The iron compound obtained in this manner is in the form of centrifuge bottoms or of filter cake from a filter press, which is more or less compact depending on the solids content of the filter cake. The water content of the solid obtained can vary from 95% to about 80%, achievable if using a filter press.

The drawback of this procedure is that the solid obtained in the aforedescribed ways easily disintegrates in the water to be treated and is entrained away by it when used in a filtration plant.

To overcome this drawback, it has already been proposed to dry the colloid at ambient temperature or above, until more then 50% of the water is removed. In his manner the product assumes the form of dry or hard lumps of hydroxide. These lumps are then granulated, for example in mills, to obtain a product of particle size suitable for use in a filtration plant. In other cases the still moist material can be extruded to obtain small cylinders and then dried.

This process gives rise to materials characterised by a low contaminant removal capacity because the drying operation results in closure of the material pores, with a large reduction in the product specific surface, which is a decisive parameter for filtration effectiveness.

To achieve this granulation without requiring drying, freeze-thawing processes are known, consisting of freezing the product resulting from the filtration. The effect of this freezing is that the water contained in the material is removed from it by the growth of ice crystals. During growth, the crystal subtracts pure water from the product which in this manner is concentrated and compacted, but maintains a high porosity determined precisely by the canaliculi through which the freezing has drawn out the water. After this freezing, the material is thawed, the ice is converted into water and the iron hydroxide remains in the form of highly porous compact granules.

The drawback of this procedure is that the granules obtained are of very small dimensions such that when inserted into a filter, they cause high pressure drops on water passage. Moreover, during the back-wash always required in a filtration plant for reclassifying the filter bed and for removing any preferential paths for the water to be treated, the material is partly entrained by the flow and dispersed.

It has also been proposed to carry out freezing under high pressure, to achieve large-dimension granules.

This procedure has however the drawback of requiring the use of vessels able to withstand the pressures concerned, which are of the order of 800-1000 atm.

The object of the invention is to eliminate the drawbacks jointly or separately present in the known art, to obtain large-dimension and mechanically stable granules without using pressure, but instead by operating at atmospheric pressure, with the product in normal unsealed containers.

This object is attained according to the invention by a method for producing an iron-containing filter material for water treatment, described herein.

To implement the procedure, the invention uses a plant also as described herein.

The present invention is further clarified hereinafter with reference to the accompanying drawing showing a schematic view of a plant for implementing the method according to the invention.

As can be seen from the drawing, in the process according to the invention a trivalent iron compound, for example ferric chloride, is reacted with a base, for example sodium hydroxide. The reaction product is an iron hydroxide in colloidal form, together with a salt composed of the cation of the base and of the anion of the trivalent iron compound.

For example, all pairs obtainable by choosing the iron compound from ferric chloride, ferric nitrate and ferric sulphate, and the base from sodium hydroxide, potassium hydroxide and ammonia, are suitable.

A divalent iron compound, such as ferrous sulphate, can also be used as the iron starting compound, and oxidizing the divalent iron to trivalent iron during the reaction, by using an oxidant such as air or oxygen blown into the reaction environment.

In particular, the process consists of causing sodium hydroxide originating from a vessel 4 to react inside a vessel 2 containing ferric chloride until the ferric chloride is completely neutralized, to obtain iron hydroxide and sodium chloride.

The iron hydroxide and sodium chloride are then fed into ceramic membranes 6 for washing the iron hydroxide from the sodium chloride in cross-flow.

The iron hydroxide suspension is then fed to a membrane filter press 8 where part of the water is removed, until a panel 10 is obtained having a moisture content of less than 77% by weight, preferably less than 72% by weight.

The panel 10 is then inserted into containers 12 which are positioned inside a climatic chamber 14 refrigerated to a temperature of less than 0° C. for a time between 24 and 240 hours, preferably between 24 and 48 hours, depending on the container dimensions, while operating at atmospheric pressure.

The product is then left to thaw to ambient temperature, at which it is present in the form of mechanically stable grains 16, with a particle size between 0.1 and 3 mm, the percentage of material below and above these limits being less than 10% by weight.

The filter material obtained by the process according to the invention presents numerous advantages, including:
- an arsenic absorption capacity at pH 7 of around 30 mg/g,
- there is little removal from the bed in a filter in which the material has been inserted, such that with a back-wash velocity of 25 m/min, only a material fraction of less than about 1% is removed,
- the water passing through the filter undergoes low pressure drop, which is found to be less than 0.1 bar for a filter bed of height 1 metre.

A practical example is described below.

1000 kg of water were fed into a first reactor fitted with an agitator. 63 kg of ferric chloride in a 40% solution were added.

250 kg of water were fed into a second reactor. 65 kg of sodium hydroxide in a 30% solution were added thereto.

The dilute sodium hydroxide solution of the second reactor was slowly added by a metering pump to the dilute ferric chloride solution contained in the reactor.

The addition continued under agitation while constantly monitoring the pH, until pH 7 was reached.

During the reaction the temperature increased by about 2° C.

After the reaction the iron hydroxide dispersion obtained in this manner was washed in cross-flow with an ultrafiltration apparatus consisting of silicon carbide membranes, while continuing to replace the saline water permeated from the membranes with pure water, until the sodium chloride formed by the reaction was virtually eliminated.

The washed suspension of iron hydroxide was filtered with a membrane filter press until a pressure of about 12 bar was reached. The panel obtained had a solids content of about 28%.

The panel, reduced to fragments of about five centimeters in size, was placed in a plastic container with thin walls of about 1 mm, which was rested on a polystyrene panel and covered on its top with a second polystyrene panel, simply rested on it.

The container was inserted into a climatic chamber maintained at a temperature of −8.5° C. (±1° C.) and the temperature at the centre of the container, at the heart of the material, was constantly monitored.

After 41 hours, the temperature at the container centre had reached −8.2° C.

The temperature can be maintained constant at less than 0° C. in the aforedescribed manner, or can be varied in accordance with a predetermined programme.

For example, in a second experiment the climatic chamber was made to operate initially at a temperature of −5° C. for 12 hours, then at −7.5° C. for 12 hours, then at −10° C. for 12 hours, then at −15° C. for 12 hours, then at −20° C. for 12 hours, then at −25° C. for 12 hours, then at −30° C. for 12 hours. The total residence time in the climatic chamber was 84 hours, and at the end of the cycle the temperature at the container centre had reached −21° C.

The container was removed from the climatic chamber and the product left to thaw to ambient temperature.

The aforesaid ambient temperature was between 8° C. and 15° C. The thawing process lasted 240 hours.

After thawing, the granulate obtained had the aforestated characteristics.

The invention claimed is:

1. A method for producing an iron-containing filter material for water treatment, comprising:
   reacting a trivalent iron compound and a base inside a vessel until the trivalent iron is completely neutralized, to obtain an iron hydroxide and a salt consisting of an anion of the trivalent iron compound and a cation of the base;
   feeding the iron hydroxide and the salt into ceramic membranes and wash the iron hydroxide from the salt with water in cross-flow, thereby forming an iron hydroxide suspension;
   feeding the iron hydroxide suspension to a membrane filter press where part of the water is removed, to obtain a panel having a moisture content of less than 77% by weight;
   inserting the panel into containers; and
   positioning the containers inside a refrigeration chamber operating at atmospheric pressure and at a temperature of less than 0° C. for a time between 24 and 240 hours.

2. The method as claimed in claim 1, wherein the step of positioning the containers inside a refrigeration chamber comprises positioning the containers inside a refrigeration chamber operating at −5° C. for 12 hours, then at −7.5° C. for 12 hours, then at −10° C. for 12 hours, at −15° C. for 12 hours, at −20° C. for 12 hours, at −25° C. for 12 hours, and at −30° C. for 12 hours.

3. The method as claimed in claim 1, wherein the step of positioning the containers inside a refrigeration chamber comprises positioning the containers inside a refrigeration chamber operating at atmospheric pressure and at a temperature of less than 0° C. for a time between 24 and 48 hours.

4. The method as claimed in claim 1, wherein the trivalent iron compound is chosen from the group consisting of ferric chloride, ferric nitrate, and ferric sulphate.

5. The method as claimed in claim 1, wherein the base is selected from the group consisting of sodium hydroxide, potassium hydroxide, and ammonia.

6. The method as claimed in claim 1, wherein the trivalent iron is obtained by starting from a divalent iron compound which is oxidized to trivalent iron during a reaction, by use of an oxidant blown into a reaction environment.

7. The method as claimed in claim 1, wherein filtration in the membrane filter press is carried out to obtain the panel having a moisture content of less than 72% by weight.

* * * * *